United States Patent
Cheng et al.

(10) Patent No.: US 9,412,077 B2
(45) Date of Patent: Aug. 9, 2016

(54) METHOD AND APPARATUS FOR CLASSIFICATION

(71) Applicant: Baidu Online Network Technology (Beijing) Co., Ltd, Beijing (CN)

(72) Inventors: Huige Cheng, Beijing (CN); Yaozong Mao, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/587,582

(22) Filed: Dec. 31, 2014

(65) Prior Publication Data

US 2016/0063396 A1 Mar. 3, 2016

(30) Foreign Application Priority Data

Aug. 28, 2014 (CN) .......................... 2014 1 0433033

(51) Int. Cl.
*G06N 99/00* (2010.01)
*G06N 5/04* (2006.01)

(52) U.S. Cl.
CPC ................ *G06N 99/005* (2013.01); *G06N 5/04* (2013.01)

(58) Field of Classification Search
CPC ............................... G06N 99/005; G06N 5/04
USPC .......................................................... 706/12
See application file for complete search history.

(56) References Cited

U.S. PATENT DOCUMENTS

| 2004/0236611 | A1* | 11/2004 | Bonissone | G06Q 40/02 705/4 |
| 2010/0153323 | A1* | 6/2010 | Hennessy | G01N 21/65 706/20 |
| 2014/0376811 | A1* | 12/2014 | Simske | G06K 9/46 382/192 |

OTHER PUBLICATIONS

Avidan S., "Ensemble Tracking", IEEE Transactions on Pattern Analysis and Machine Intelligence, vol. 29, No. 2, Feb. 2007.*
Kolter J. et al., "DynamicWeighted Majority: A New Ensemble Method for Tracking Concept Drift", Proceedings of the Third IEEE International Conference on Data Mining (ICDM'03), 2003.*
Muhlbaier M. et al., "Learn++.NC: Combining Ensemble of Classifiers With Dynamically Weighted Consult-and-Vote for Efficient Incremental Learning of New Classes", IEEE Transactions on Neural Networks, vol. 20, No. 1, Jan. 2009.*

* cited by examiner

*Primary Examiner* — Stanley K Hill
*Assistant Examiner* — Dave Misir
(74) *Attorney, Agent, or Firm* — Orrick, Herrington & Sutcliffe, LLP (57) ABSTRACT

The present invention provides a method and apparatus for classification. In the embodiments of the present invention, data to be predicted is input into M target classifiers respectively, so as to obtain the predicted result output by each target classifier of the M target classifiers, where M is an integer greater than or equal to 2, and each of the target classifiers is independent of another, so that a classification result of the data can be obtained according to the predicted result output by each of the target classifiers and a prediction weight of each of the target classifiers; and since each target classifier of the M target classifiers is independent of another, the classification result of the data can be obtained by making full use of the classification capability of each target classifier, thus improving the accuracy of the classification result.

16 Claims, 2 Drawing Sheets

METHOD AND APPARATUS FOR CLASSIFICATION

CROSS-REFERENCE TO RELATED APPLICATIONS

The present application claims priority to Chinese Patent Application No. CN201410433033.5, filed on Aug. 28, 2014, the entire disclosure of which is incorporated herein by reference in its entirety and for all purposes.

TECHNICAL FIELD

The present invention relates to machine learning technology, and in particular to a method and apparatus for classification.

BACKGROUND

In machine learning, a large number of known training samples can be used to construct a classification model, i.e. a classifier, and then the constructed classifier is used to predict unknown data. The classifier can be applied in many scenarios, for example, since there are more and more spam pages produced due to network cheating, which seriously affects the retrieval efficiency of a search engine and user experience, anti-cheating has become one of the most important challenges faced by search engines; a classifier can be constructed using labeled normal data and cheating data, so as to identify network data. In the prior art, a constructed classifier can be used to predict data, so as to obtain a classification result.

However, when a single classifier is used, the accuracy of the classification result of the data predicted thereby is not high.

SUMMARY

A method and apparatus for classification are provided in a plurality of aspects of the present invention to improve the accuracy of the classification result.

A method for classification is provided in one aspect of the present invention, comprising:

inputting data to be predicted into M target classifiers respectively, so as to obtain the predicted result output by each target classifier of the M target classifiers, where M is an integer greater than or equal to 2, and each target classifier is independent of another; and obtaining, according to the predicted result output by each of the target classifiers and a prediction weight of each of the target classifiers, a classification result of the data.

The aspect as mentioned above and any possible implementation further provide an implementation, which, prior to the step of inputting data to be predicted into M target classifiers, so as to obtain the predicted result output by each target classifier of the M target classifiers, further comprises:

using each training sample set of M training sample sets to respectively construct 1 target classifier, with the training samples contained in each of the training sample sets not being identical; or using 1 training sample set to construct 1 target classifier respectively using each classification algorithm of M classification algorithms.

The aspect as mentioned above and any possible implementation further provide an implementation, which, prior to the step of obtaining, according to the predicted result output by each of the target classifiers and a prediction weight of each of the target classifiers, a classification result of the data, further comprises:

obtaining, according to the classification accuracy of each of the target classifiers, a first weight value of each of the target classifiers;

obtaining, according to a first assigned time and construction time of each of the target classifiers, a second weight value of each of the target classifiers; and obtaining, according to the first weight value and the second weight value, a prediction weight of each of the target classifiers.

The aspect as mentioned above and any possible implementation further provide an implementation, which, prior to the step of inputting data to be predicted into M target classifiers, so as to obtain the predicted result output by each target classifier of the M target classifiers, further comprises:

determining N candidate classifiers to be updated, with N being an integer greater than or equal to M;

obtaining, according to the classification accuracy of each candidate classifier of the N candidate classifiers, a third weight value of each of the candidate classifiers;

obtaining, according to a second assigned time and construction time of each of the candidate classifiers, a fourth weight value of each of the candidate classifiers; and removing, according to the third weight value and/or the fourth weight value, P candidate classifiers from the N candidate classifiers, so as to obtain the M target classifiers, with P being an integer which is greater than or equal to 1 and smaller than or equal to N−2.

The aspect as mentioned above and any possible implementation further provide an implementation, which, prior to the step of inputting data to be predicted into M target classifiers, so as to obtain the predicted result output by each target classifier of the M target classifiers, further comprises:

determining 1 constructed new candidate classifier;

obtaining, according to the classification accuracy of the new candidate classifier, a fifth weight value of the new candidate classifier;

obtaining, according to a third assigned time and construction time of the new candidate classifier, a sixth weight value of each of the candidate classifiers; and taking Q candidate classifiers to be updated and the new candidate classifier as the M target classifiers, according to the fifth weight value and/or the sixth weight value.

An apparatus for classification is provided in another aspect of the present invention, comprising:

a classification unit for inputting data to be predicted into M target classifiers, so as to obtain the predicted result output by each target classifier of the M target classifiers, where M is an integer greater than or equal to 2, and each target classifier is independent of another; and a processing unit for obtaining, according to the predicted result output by each of the target classifiers and a prediction weight of each of the target classifiers, a classification result of the data.

The aspect as mentioned above and any possible implementation further provide an implementation, wherein the apparatus further comprises a construction unit for using each training sample set of M training sample sets to respectively construct 1 target classifier, with the training samples contained in each of the training sample sets not being identical; or using 1 training sample set to construct 1 target classifier respectively using each classification algorithm of M classification algorithms.

The aspects as mentioned above and any possible implementation further provide an implementation, wherein the processing unit is further used for obtaining, according to the classification accuracy of each of the target classifiers, a first weight value of each of the target classifiers;

obtaining, according to a first assigned time and construction time of each of the target classifiers, a second weight value of each of the target classifiers; and obtaining, according to the first weight value and the second weight value, a prediction weight of each of the target classifiers.

The aspect as mentioned above and any possible implementation further provide an implementation, wherein the apparatus further comprises a first update unit for determining N candidate classifiers to be updated, with N being an integer greater than or equal to M;

obtaining, according to the classification accuracy of each candidate classifier of the N candidate classifiers, a third weight value of each of the candidate classifiers;

obtaining, according to a second assigned time and construction time of each of the candidate classifiers, a fourth weight value of each of the candidate classifiers; and removing, according to the third weight value and/or the fourth weight value, P candidate classifiers from the N candidate classifiers, so as to obtain the M target classifiers, with P being an integer which is greater than or equal to 1 and smaller than or equal to N−2.

The aspect as mentioned above and any possible implementation further provide an implementation, wherein the apparatus further comprises a second update unit for determining 1 constructed new candidate classifier;

obtaining, according to the classification accuracy of the new candidate classifier, a fifth weight value of the new candidate classifier;

obtaining, according to a third assigned time and construction time of the new candidate classifier, a sixth weight value of each of the candidate classifiers; and taking Q candidate classifiers to be updated and the new candidate classifier as the M target classifiers, according to the fifth weight value and/or the sixth weight value.

It can be learnt from the technical solutions mentioned above that, in the embodiments of the present invention, data to be predicted is input into M target classifiers respectively, so as to obtain the predicted result output by each target classifier of the M target classifiers, where M is an integer greater than or equal to 2, and each of the target classifiers is independent of another, so that a classification result of the data can be obtained according to the predicted result output by each of the target classifiers and a prediction weight of each of the target classifiers; and since each target classifier of the M target classifiers is independent of another, the classification result of the data can be obtained by making full use of the classification capability of each target classifier, thus improving the accuracy of the classification result.

In addition, by means of the technical solutions provided in the present invention, the classification result of data is not solely dependent on the predicted result of any one target classifier any more, but the predicted result of each target classifier of M target classifiers is considered comprehensively; in this way, the accuracy of the classification result can be effectively improved.

In addition, by means of the technical solutions provided in the present invention, by dynamically updating the number of candidate classifiers, i.e. removing a candidate classifier which does not satisfy the classification requirement, or adding a new candidate classifier, a classification system capable of functioning properly, i.e. M target classifiers, is obtained; in this way, the problem in the prior art that using re-labeled training samples to re-construct a target classifier to replace an original target classifier makes it impossible to make full use of the original target classifier can be avoided, and the utilization rate of target classifiers can be effectively improved.

BRIEF DESCRIPTION OF THE ACCOMPANYING DRAWINGS

In order to illustrate the technical solutions in the embodiments of the present invention more clearly, the accompanying drawings required to be used in the description of the embodiments or the prior art are briefly introduced below. Clearly, the accompanying drawings in the following description are some embodiments of the present invention, and those of ordinary skill in the art may further obtain other drawings according to these accompanying drawings without making inventive efforts.

DETAILED DESCRIPTION OF THE PREFERRED EMBODIMENTS

In order to make the objectives, technical solutions and advantages of the embodiments of the present invention more clear, the technical solutions in the embodiments of the present invention will be described clearly and completely below in combination with the accompanying drawings in the embodiments of the present invention. Clearly, the described embodiments are some of the embodiments of the present invention rather than all the embodiments. All other embodiments obtained by those of ordinary skill in the art based on the embodiments in the present invention without making inventive efforts are within the scope of protection of the present invention.

In addition, the term "and/or" herein is merely an association relationship describing associated objects, and indicates that three relationships may exist, for example, A and/or B may represent: three cases where A exists alone, A and B exist simultaneously, and B exists alone. In addition, the character "/" herein generally indicates an "or" relationship between associated objects.

Figure 1:
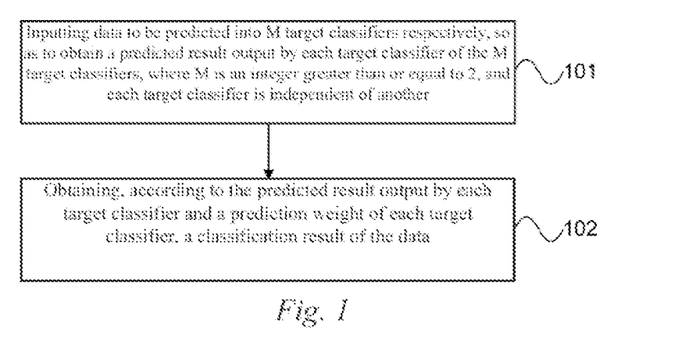
FIG. 1 is a schematic flowchart of a method for classification provided in an embodiment of the present invention.

FIG. 1 is a schematic flowchart of a method for classification provided in an embodiment of the present invention, as shown in FIG. 1.

101. Data to be predicted is input into M target classifiers respectively, so as to obtain the predicted result output by each target classifier of the M target classifiers, where M is an integer greater than or equal to 2, and each target classifier is independent of another.

The meaning of the word "target" in the so-called target classifier is "required to be used at present" herein, that is, the target classifier is a classifier required to be used at present, but not a special classifier with a particular function definition.

The M target classifiers involved in this embodiment can form an integrated classification system, and each target classifier is independent of another.

102. A classification result of the data is obtained according to the predicted result output by each of the target classifiers and a prediction weight of each of the target classifiers.

It shall be noted that the execution body of 101 and 102 may be an application located in a local terminal, or may also be a functional unit such as a plug-in or a software development kit (SDK) arranged in the application located in the local terminal, or may also be a classification engine located in a network-side server, this is not particularly limited in this embodiment.

It can be understood that the application may be a native program (nativeAPP) installed on a terminal, or may also be a webpage program (webAPP) of a browser on the terminal; this is not limited in this embodiment.

In this way, data to be predicted is input into M target classifiers respectively, so as to obtain the predicted result output by each target classifier of the M target classifiers, where M is an integer greater than or equal to 2, and each of the target classifiers is independent of another, so that a classification result of the data can be obtained according to the predicted result output by each of the target classifiers and a prediction weight of each of the target classifiers; and since each target classifier of the M target classifiers is independent of another, the classification result of the data can be obtained by making full use of the classification capability of each target classifier, thus improving the accuracy of the classification result.

Optionally, in a possible implementation of this embodiment, prior to 101, some training samples should be further used to carry out training, so as to respectively construct each target classifier of the M target classifiers.

For example, each training sample set of M training sample sets can be specifically used to respectively construct 1 target classifier, with the training samples contained in each of the training sample sets not being identical.

Alternatively, for another example, 1 training sample set can also be specifically used to respectively construct 1 target classifier using each classification algorithm of M classification algorithms. Each classification algorithm has a classification direction of interest thereto.

It should be noted that the training samples contained in each training sample set can be labeled known samples; in this way, these known samples can be directly used for training, so as to construct a target classifier. Alternatively, some of the training samples contained in each training sample set can be labeled known samples, with the others being unlabeled unknown samples; in this way, the known samples can be used for training first, so as to construct an initial classifier, and then the initial classifier can be used to predict the unknown samples, so as to obtain a classification result; and then the unknown samples can be labeled according to the classification result of the unknown samples, so as to form known samples as newly added known samples; and the newly added known samples and the original known samples are used for re-training, so as to construct a new classifier, until the constructed classifier or known samples satisfy the closing condition of the target classifier, for example, the classification accuracy is greater than or equal to a preset accuracy threshold, or the number of known samples is greater than or equal to a preset number threshold; this is not particularly limited in this embodiment.

If a single target classifier is used, the performance requirement therefor is extremely high, for example the classification accuracy should exceed 99.9%, so construction is very difficult. However, with an integrated classification system, i.e. a classification system containing M target classifiers, the requirement for each target classifier need not be rigorous, for example, the accuracy of each target classifier just needs to be greater than or equal to 80%, which is easily achievable; therefore, the difficulty of constructing the target classifier can be effectively decreased.

Optionally, in a possible implementation of this embodiment, prior to 102, the method can further comprise: obtaining, according to the classification accuracy of each of the target classifiers, a first weight value of each of the target classifiers, and obtaining, according to a first assigned time and construction time of each of the target classifiers, a second weight value of each of the target classifiers; and then a prediction weight of each of the target classifiers can be obtained according to the first weight value and the second weight value.

The classification accuracy of the target classifier, i.e. the accuracy of the predicted result output by the target classifier, refers to the percentage of the total data that can be correctly classified. Generally, a test sample can be input into a classifier to obtain a test result of the test sample. The test sample is some data of a known type, and is similar to a training sample but of different use; a training sample is used for constructing a classifier, and a test sample is used for testing a constructed classifier. The test result of the test sample is compared to the known type of the test sample. If the two are consistent, this indicates that the test result is correct, that is, the data is correctly classified; and if the two are not consistent, this indicates that the test result is wrong, that is, the data is not correctly classified.

It should be noted that the execution of "obtaining, according to the classification accuracy of each of the target classifiers, a first weight value of each of the target classifiers" and "obtaining, according to a first assigned time and construction time of each of the target classifiers, a second weight value of each of the target classifiers" may not be in a fixed order; it is possible to execute "obtaining, according to the classification accuracy of each of the target classifiers, a first weight value of each of the target classifiers" first and then "obtaining, according to a first assigned time and construction time of each of the target classifiers, a second weight value of each of the target classifiers"; alternatively, it is also possible to simultaneously execute "obtaining, according to the classification accuracy of each of the target classifiers, a first weight value of each of the target classifiers" and "obtaining, according to a first assigned time and construction time of each of the target classifiers, a second weight value of each of the target classifiers"; and alternatively, it is also possible to execute "obtaining, according to a first assigned time and construction time of each of the target classifiers, a second weight value of each of the target classifiers" and then "obtaining, according to the classification accuracy of each of the target classifiers, a first weight value of each of the target classifiers"; this is not particularly limited in this embodiment.

Specifically, a first weight value of each of the target classifiers can be obtained specifically according to the classification accuracy of each of the target classifiers using formula (1).

$$w_{1i} = \frac{\log\frac{p_i}{1-p_i}}{\sum_{i=1}^{n}\log\frac{p_i}{1-p_i}} \quad \text{formula (1)}$$

where $w_{1i}$ is a first weight value of the ith target classifier, and can be denoted as an accuracy weight value;

$p_i$ is the classification accuracy of the ith target classifier; and n is the number of target classifiers, i.e. M.

It can be seen that the higher the classification accuracy of a target classifier is, the greater the first weight value of the target classifier is; on the contrary, the lower the classification accuracy of a target classifier is, the smaller the first weight value of the target classifier is.

Specifically, a second weight value of each of the target classifiers can be obtained specifically according to a first assigned time and construction time of each of the target classifiers using formula (2).

$$w_{2i} = \frac{\log\frac{2\sum_{i=1}^{n}T_i}{T_i} - 1}{\sum_{i=1}^{n}\log\frac{2\sum_{i=1}^{n}T_i}{T_i} - 1} \quad \text{formula (2)}$$

$w_{2i}$ is a second weight value of the ith target classifier, and can be denoted as a time weight value;

$T_i$ is the difference between the first assigned time and the construction time of the ith target classifier; and n is the number of target classifiers, i.e. M.

The first assigned time can be a time value when a current operation is carried out, or can also be a time value when some operation is expected to be carried out in the future; this is not particularly limited in this embodiment.

It can be seen that the farther the construction time of the target classifier is from the first assigned time, the greater the second weight value of the target classifier is; on the contrary, the closer the construction time of the target classifier is to the first assigned time, the smaller the second weight value of the target classifier is.

In this way, after the first weight value and the second weight value are obtained, a prediction weight of each target classifier can be obtained according to the first weight value and the second weight value. For example, the prediction weight of the target classifier can be obtained by finding the arithmetic average of the first weight value and the second weight value. Alternatively, for another example, the prediction weight of the target classifier can be obtained by finding the weighted average of the first weight value and the second weight value using a preset weighting factor corresponding to the first weight value and a preset weighting factor corresponding to the second weight value. The weighting factor corresponding to the first weight value and the weighting factor corresponding to the second weight value can be flexibly set according to the classification requirement; this is not particularly limited in this embodiment. This method gives consideration to effects of both the classification accuracy of the target classifier and the construction time of the target classifier, and can further improve the accuracy of the classification result.

Optionally, in a possible implementation of this embodiment, prior to 101, an update operation can also be further carried out, so as to update the number of candidate classifiers, i.e. remove a candidate classifier which does not satisfy the classification requirement or add a new candidate classifier, and finally M target classifiers are dynamically generated for the execution of 101 and 102. The specific method for implementing the update operation can be as stated below.

Specifically, N candidate classifiers to be updated can be specifically determined, with N being an integer greater than or equal to M; and then a third weight value of each of the candidate classifiers is obtained according to the classification accuracy of each of the candidate classifiers in the N candidate classifiers, and a fourth weight value of each of the candidate classifiers is obtained according to the second assigned time and the construction time of each of the candidate classifiers. After that, it is possible to remove P candidate classifiers from the N candidate classifiers according to the third weight value and/or the fourth weight value, so as to obtain the M target classifiers, with P being an integer which is greater than or equal to 1 and smaller than or equal to N−2.

It can be appreciated that the method for acquiring the third weight value of each candidate classifier can refer to the method for acquiring the first weight value of each target classifier, and a detailed description can be found by referring to the foregoing relevant content, which will not be repeated here. Similarly, the method for acquiring the fourth weight value of each candidate classifier can refer to the method for acquiring the second weight value of each target classifier, and a detailed description can be found by referring to the foregoing relevant content, which will not be repeated here. The second assigned time can be a time value when a current operation is carried out, or can also be a time value when some operation is expected to be carried out in the future; this is not particularly limited in this embodiment.

For example, a candidate classifier, the third weight value of which is smaller than the preset accuracy threshold such as 0.5, is removed from the N candidate classifiers.

Alternatively, for another example, a candidate classifier, the fourth weight value of which is smaller than the preset time threshold such as 0.6, is removed from the N candidate classifiers.

Alternatively, for another example, a candidate classifier, the third weight value of which is smaller than the preset accuracy threshold such as 0.5 and the fourth weight value of which is smaller than the preset time threshold such as 0.6, is removed from the N candidate classifiers.

Specifically, 1 constructed new candidate classifier can be specifically determined; and then a fifth weight value of the new candidate classifier is obtained according to the classification accuracy of the new candidate classifier, and a sixth weight value of each of the candidate classifiers is obtained according to the third assigned time and the construction time of the new candidate classifier. After that, Q candidate classifiers to be updated and the new candidate classifier can be taken as the M target classifiers, according to the fifth weight value and/or the sixth weight value.

It can be appreciated that the method for acquiring the fifth weight value of the new candidate classifier can refer to the method for acquiring the first weight value of each target classifier, and a detailed description can be found by referring to the foregoing relevant content, which will not be repeated here. Similarly, the method for acquiring the sixth weight value of the new candidate classifier can refer to the method for acquiring the second weight value of each target classifier, and a detailed description can be found by referring to the foregoing relevant content, which will not be repeated here. The third assigned time can be a time value when a current operation is carried out, or can also be a time value when some operation is expected to be carried out in the future; this is not particularly limited in this embodiment.

For example, a candidate classifier, the fifth weight value of which is greater than or equal to a preset accuracy threshold such as 0.5, is taken as a target classifier of the M target classifiers.

Alternatively, for another example, a candidate classifier, the sixth weight value of which is greater than or equal to a preset time threshold such as 0.6, is taken as a target classifier of the M target classifiers.

Alternatively, for another example, a candidate classifier, the fifth weight value of which is greater than or equal to a preset accuracy threshold such as 0.5 and the sixth weight value of which is greater than or equal to a preset time threshold such as 0.6, is taken as a target classifier of the M target classifiers.

The following conclusion can be drawn through experimental verification: as the number of target classifiers used, i.e. the value of M, increases, the accuracy of the classification result gradually increases.

In this way, by dynamically updating the number of candidate classifiers, i.e. removing a candidate classifier which does not satisfy the classification requirement, or adding a new candidate classifier, a classification system capable of functioning properly, i.e. M target classifiers, is obtained; in this way, the problem in the prior art that using re-labeled training samples to re-construct a target classifier to replace an original target classifier makes it impossible to make full use of the original target classifier can be avoided, and the utilization rate of target classifiers can be effectively improved.

In this embodiment, data to be predicted is input into M target classifiers respectively, so as to obtain the predicted result output by each target classifier of the M target classifiers, where M is an integer greater than or equal to 2, and each of the target classifiers is independent of another, so that a classification result of the data can be obtained according to the predicted result output by each of the target classifiers and a prediction weight of each of the target classifiers; and since each target classifier of the M target classifiers is independent of another, the classification result of the data can be obtained by making full use of the classification capability of each target classifier, thus improving the accuracy of the classification result.

In addition, by means of the technical solutions provided in the present invention, the classification result of data is not solely dependent on the predicted result of any one target classifier any more, but the predicted result of each target classifier of M target classifiers is considered comprehensively; in this way, the accuracy of the classification result can be effectively improved.

In addition, by means of the technical solutions provided in the present invention, by dynamically updating the number of candidate classifiers, i.e. removing a candidate classifier which does not satisfy the classification requirement, or adding a new candidate classifier, a classification system capable of functioning properly, i.e. M target classifiers, is obtained; in this way, the problem in the prior art that using re-labeled training samples to re-construct a target classifier to replace an original target classifier makes it impossible to make full use of the original target classifier can be avoided, and the utilization rate of target classifiers can be effectively improved.

It shall be noted that, regarding the foregoing method embodiments, for the sake of simple description, the methods are described as a series of action combinations, but those of ordinary skill in the art shall know that the present invention is not limited to the action sequence described, because according to the present invention, some steps may be performed in other sequences or performed simultaneously. Secondly, those skilled in the art shall also know that the embodiments described in the description are all preferred embodiments, and the actions and modules involved are not necessarily required in the present invention.

In the embodiments above, the description of each embodiment has its own emphasis, and for a part that is not detailed in a certain embodiment, reference can be made to the relevant description of other embodiments.

Figure 2:
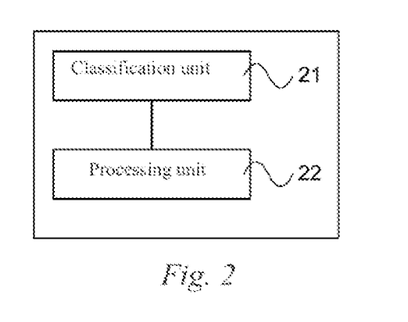
FIG. 2 is a structural schematic diagram of an apparatus for classification provided in another embodiment of the present invention.

FIG. 2 is a structural schematic diagram of an apparatus for classification provided in another embodiment of the present invention, as shown in FIG. 2. The apparatus for classification in this embodiment can comprise a classification unit 21 and a processing unit 22. The classification unit 21 is used for inputting data to be predicted into M target classifiers respectively, so as to obtain the predicted result output by each target classifier of the M target classifiers, where M is an integer greater than or equal to 2, and each of the target classifiers is independent of another; and the processing unit 22 is used for obtaining, according to the predicted result output by each of the target classifiers and a prediction weight of each of the target classifiers, a classification result of the data.

It shall be noted that the apparatus for classification provided in this embodiment may be an application located in a local terminal, or may also be a functional unit such as a plug-in or a software development kit (SDK) arranged in the application located in the local terminal, or may also be a classification engine located in a network-side server; this is not particularly limited in this embodiment.

It can be understood that the application may be a native program (nativeAPP) installed on a terminal, or may also be a webpage program (webAPP) of a browser on the terminal; this is not limited in this embodiment.

Figure 3:
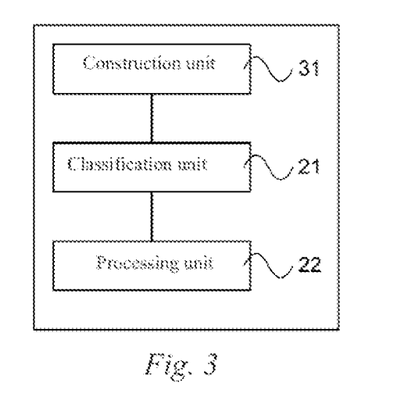
FIG. 3 is a structural schematic diagram of an apparatus for classification provided in another embodiment of the present invention.

Optionally, in a possible implementation of this embodiment, as shown in FIG. 3, the apparatus for classification provided in this embodiment can further comprise a construction unit 31, which can be used for using each training sample set of M training sample sets to respectively construct 1 target classifier, training samples contained in each of the training sample sets not being identical; or can also be used for using 1 training sample set to respectively construct 1 target classifier using each classification algorithm of M classification algorithms.

Optionally, in a possible implementation of this embodiment, the processing unit 22 can further be used for obtaining, according to the classification accuracy of each of the target classifiers, a first weight value of each of the target classifiers; obtaining, according to a first assigned time and construction time of each of the target classifiers, a second weight value of each of the target classifiers; and obtaining, according to the first weight value and the second weight value, a prediction weight of each of the target classifiers.

Figure 4:
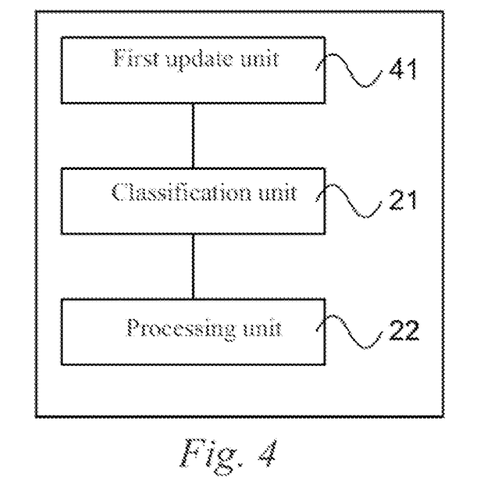
FIG. 4 is a structural schematic diagram of an apparatus for classification provided in another embodiment of the present invention.

Optionally, in a possible implementation of this embodiment, as shown in FIG. 4, the apparatus for classification provided in this embodiment can further comprise a first update unit 41, which can be used for determining N candidate classifiers to be updated, with N being an integer greater than or equal to M; obtaining, according to the classification accuracy of each candidate classifier of the N candidate classifiers, a third weight value of each of the candidate classifiers; obtaining, according to a second assigned time and construction time of each of the candidate classifiers, a fourth weight value of each of the candidate classifiers; and removing, according to the third weight value and/or the fourth weight value, P candidate classifiers from the N candidate classifiers, so as to obtain the M target classifiers, with P being an integer which is greater than or equal to 1 and smaller than or equal to N−2.

Figure 5:
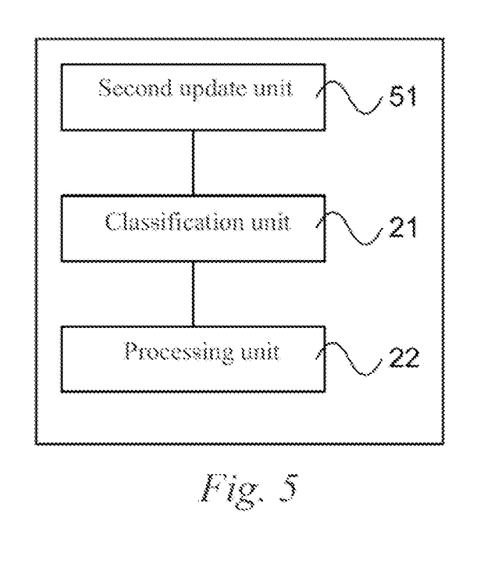
FIG. 5 is a structural schematic diagram of an apparatus for classification provided in another embodiment of the present invention.

Optionally, in a possible implementation of this embodiment, as shown in FIG. 5, the apparatus for classification provided in this embodiment can further comprise a second update unit 51, which can be used for determining 1 constructed new candidate classifier; obtaining, according to the classification accuracy of the new candidate classifier, a fifth weight value of the new candidate classifier; obtaining, according to a third assigned time and construction time of the new candidate classifier, a sixth weight value of each of the candidate classifiers; and taking Q candidate classifiers to be updated and the new candidate classifier as the M target classifiers, according to the fifth weight value and/or the sixth weight value.

It shall be noted that the method in the embodiment corresponding to FIG. 1 may be implemented by the apparatus for classification provided in this embodiment. Reference may be made to relevant content in the embodiment corresponding to FIG. 1 for a detailed description, which will not be repeated here.

In this embodiment, by means of a classification unit, data to be predicted is input into M target classifiers respectively, so as to obtain the predicted result output by each target classifier of the M target classifiers, where M is an integer greater than or equal to 2, and each of the target classifiers is independent of another, so that a processing unit can obtain a classification result of the data according to the predicted result output by each of the target classifiers and a prediction weight of each of the target classifiers; and since each target classifier of the M target classifiers is independent of another, the classification result of the data can be obtained by making full use of the classification capability of each target classifier, thus improving the accuracy of the classification result.

In addition, by means of the technical solutions provided in the present invention, the classification result of data is not solely dependent on the predicted result of any one target classifier any more, but the predicted result of each target classifier of M target classifiers is considered comprehensively; in this way, the accuracy of the classification result can be effectively improved.

In addition, by means of the technical solutions provided in the present invention, by dynamically updating the number of candidate classifiers, i.e. removing a candidate classifier which does not satisfy the classification requirement, or adding a new candidate classifier, a classification system capable of functioning properly, i.e. M target classifiers, is obtained; in this way, the problem in the prior art that using re-labeled training samples to re-construct a target classifier to replace an original target classifier makes it impossible to make full use of the original target classifier can be avoided, and the utilization rate of target classifiers can be effectively improved.

Those of ordinary skill in the art may clearly understand that, for the convenience and brevity of description, the specific operation processes of the above systems, apparatuses, and units may refer to the corresponding processes in the method embodiments, which will not be described here.

In a few embodiments provided in the present invention, it shall be understood that the disclosed system, apparatus and method may be implemented in other manners. For example, the apparatus embodiments described above are merely illustrative, for example, the division of the units is merely a logical function division, and there may be other ways of dividing the units in actual implementation, for example, a plurality of units or components may be combined or may be integrated into another system, or some features may be omitted, or not carried out. Another point is that a coupling or direct coupling or communication connection shown or discussed may be an indirect coupling or a communication connection via some interfaces, apparatuses, or units, and may be electrical, mechanical, or in other forms.

The units described as separate components may or may not be physically separated, and components displayed as units may or may not be physical units, that is, may be located in one position, or may also be distributed on a plurality of network elements. Some or all of the units may be selected according to actual needs to achieve the objectives of the solutions of the present embodiments.

In addition, various functional units in various embodiments of the present invention may be integrated into one processing unit, or each of the units may also exist alone physically, or two or more units may be integrated into one unit. The integrated unit above may be implemented in the form of hardware or may also be implemented in the form of hardware with software functional units.

The integrated unit implemented by software functional units may be stored in a computer readable storage medium. The software functional units are stored in a storage medium and include a plurality of instructions for enabling a computer device (which can be a personal computer, a server, or a network device) or a processor to execute some steps of the method described in embodiments of the present invention. The foregoing storage medium comprises: various media that may store program codes, such as a USB flash drive, a removable hard disk, a read-only memory (ROM), a random access memory (RAM), a magnetic disk, or an optical disk.

It shall be noted finally that the embodiments above are merely used for illustrating the technical solutions of the present invention rather than limiting same; although the present invention is described in detail with reference to the foregoing embodiments, those of ordinary skill in the art shall understand that they may still make modifications to the technical solutions stated in the foregoing various embodiments or make equivalent replacements of some technical features thereof; and these modifications or replacements shall not result in the essence of the corresponding technical solutions departing from the spirit and scope of the technical solutions of the various embodiments of the present invention.

What is claimed is:

1. A method for classification, comprising:
associating network data to be predicted with a predetermined number M of respective target classifiers, the predetermined number M being an integer that is greater than one;
obtaining a predicted result from each of the target classifiers;
obtaining a classification result of the network data based upon the predicted result and a prediction weight of each of the target classifiers;
determining a predetermined number N of candidate classifiers to be updated, the predetermined number N being an integer greater than or equal to the predetermined number M;

obtaining a third weight value for each of the candidate classifiers based upon a classification accuracy of each of the candidate classifiers;

obtaining a fourth weight value for each of the candidate classifiers based upon a second assigned time and construction time of each of the candidate classifiers; and removing a predetermined number P of the candidate classifiers from the predetermined number N of the candidate classifiers to obtain the predetermined number M of the target classifiers, the predetermined number P being an integer that is greater than or equal to one and that is smaller than or equal to N−2, wherein said determining, said obtaining the third weight value, said obtaining the fourth weight value and said removing each occur prior to said associating the network data.

2. The method of claim 1, wherein each of the target classifiers is independent from others of the target classifiers.

3. The method of claim 1, further comprising:

obtaining a first weight value of each of the target classifiers based upon a classification accuracy of each of the target classifiers;

obtaining a second weight value of each of the target classifiers based upon a first assigned time and construction time of each of the target classifiers; and obtaining a prediction weight of each of the target classifiers based upon the first weight value and the second weight value, wherein said obtaining the first weight value, said obtaining the second weight value and said obtaining the prediction weight each occur prior to said obtaining the classification result.

4. The method of claim 1, further comprising using each training sample set of M training sample sets to construct one target classifier, wherein each of the training sample sets includes respective training samples that are not being identical among the training sample sets.

5. The method of claim 4, wherein said using each training sample set occurs before said associating the network data.

6. The method of claim 1, further comprising using one training sample set of M training sample sets to construct one target classifier using a respectively classification process selected from a group of M classification processes.

7. The method of claim 6, wherein said using one training sample set occurs before said associating the network data.

8. The method of claim 1, further comprising:

determining one constructed new candidate classifier;

obtaining a fifth weight value of the new candidate classifier based upon a classification accuracy of the new candidate classifier;

obtaining a sixth weight value for each of the candidate classifiers based upon a third assigned time and construction time of the new candidate classifier; and identifying a predetermined number Q of the candidate classifiers to be updated and designating the new candidate classifier as the predetermined number M of the target classifiers based upon at least one of the fifth weight value and the sixth weight value, wherein said determining, said obtaining the fifth weight value, said obtaining the sixth weight value, said identifying and said designating each occur prior to said associating the network data.

9. An apparatus for classification, comprising:

a classification unit configured to associate network data to be predicted with a predetermined number M of target classifiers respectively and for obtaining a predicted result from each of the target classifiers, each of the of target classifiers being independent from others of the target classifiers, the predetermined number M being an integer that is greater than one;

a processing unit configured to obtain a classification result of the network data based upon the predicted result and a prediction weight of each of the target classifiers; and a first update unit configured to:

determine a predetermined number N of candidate classifiers to be updated, the predetermined number N being an integer greater than or equal to the predetermined number M;

obtain a third weight value for each of the candidate classifiers based upon a classification accuracy of each of the candidate classifiers;

obtain a fourth weight value for each of the candidate classifiers based upon a second assigned time and construction time of each of the candidate classifiers; and remove a predetermined number P of the candidate classifiers from the predetermined number N of the candidate classifiers to obtain the predetermined number M of the target classifiers, the predetermined number P being an integer that is greater than or equal to one and that is smaller than or equal to N−2.

10. The apparatus of claim 9, further comprising a construction unit configured to use each training sample set of M training sample sets to construct one target classifier, wherein each of the training sample sets includes respective training samples that are not being identical among the training sample sets.

11. The apparatus of claim 9, wherein said processing unit is further configured to:

obtain a first weight value of each of the target classifiers based upon a classification accuracy of each of the target classifiers;

obtain a second weight value of each of the target classifiers based upon a first assigned time and construction time of each of the target classifiers; and obtain a prediction weight of each of the target classifiers based upon the first weight value and the second weight value.

12. The apparatus of claim 9, further comprises a second update unit configured to:

determine one constructed new candidate classifier;

obtain a fifth weight value of the new candidate classifier based upon a classification accuracy of the new candidate classifier;

obtain a sixth weight value for each of the candidate classifiers based upon a third assigned time and construction time of the new candidate classifier; and identify a predetermined number Q of the candidate classifiers to be updated and instruction for designating the new candidate classifier as the predetermined number M of the target classifiers based upon at least one of the fifth weight value and the sixth weight value.

13. A non-transitory computer storage medium including at least one program for classification when implemented by a processor, comprising:

instruction for associating network data to be predicted with a predetermined number M of target classifiers respectively, each of the of target classifiers being independent from others of the target classifiers, the predetermined number M being an integer that is greater than one;

instruction for obtaining a predicted result from each of the target classifiers;

instruction for obtaining a classification result of the network data based upon the predicted result and a prediction weight of each of the target classifiers;

instruction for determining a predetermined number N of candidate classifiers to be updated, the predetermined number N being an integer greater than or equal to the predetermined number M;

instruction for obtaining a third weight value for each of the candidate classifiers based upon a classification accuracy of each of the candidate classifiers;

instruction for obtaining a fourth weight value for each of the candidate classifiers based upon a second assigned time and construction time of each of the candidate classifiers; and instruction for removing a predetermined number P of the candidate classifiers from the predetermined number N of the candidate classifiers to obtain the predetermined number M of the target classifiers, the predetermined number P being an integer that is greater than or equal to one and that is smaller than or equal to N−2, wherein said instruction for determining, said instruction for obtaining the third weight value, said instruction for obtaining the fourth weight value and said instruction for removing each occur prior to said instruction for associating the network data when implemented by the processor.

14. The computer storage medium of claim 13, further comprising:

instruction for obtaining a first weight value of each of the target classifiers based upon a classification accuracy of each of the target classifiers;

instruction for obtaining a second weight value of each of the target classifiers based upon a first assigned time and construction time of each of the target classifiers; and instruction for obtaining a prediction weight of each of the target classifiers based upon the first weight value and the second weight value, wherein said instruction for obtaining the first weight value, said instruction for obtaining the second weight value and said instruction for obtaining the prediction weight each occur prior to said instruction for obtaining the classification result when implemented by the processor.

15. The computer storage medium of claim 13, further comprising instruction for using each training sample set of M training sample sets to construct one target classifier, wherein each of the training sample sets includes respective training samples that are not being identical among the training sample sets, and wherein said instruction for using each training sample set occurs before said instruction for associating the network data when implemented by the processor.

16. The computer storage medium of claim 13, further comprising:

instruction for determining one constructed new candidate classifier;

instruction for obtaining a fifth weight value of the new candidate classifier based upon a classification accuracy of the new candidate classifier;

instruction for obtaining a sixth weight value for each of the candidate classifiers based upon a third assigned time and construction time of the new candidate classifier; and instruction for identifying a predetermined number Q of the candidate classifiers to be updated and instruction for designating the new candidate classifier as the predetermined number M of the target classifiers based upon at least one of the fifth weight value and the sixth weight value, wherein said instruction for determining, said instruction for obtaining the fifth weight value, said instruction for obtaining the sixth weight value, said instruction for identifying and said instruction for designating each occur prior to said instruction for associating the network data when implemented by the processor.

\* \* \* \* \*